United States Patent [19]

Nakano et al.

[11] Patent Number: 5,046,167
[45] Date of Patent: Sep. 3, 1991

[54] VIDEO TAPE RECORDER WITH A VIDEO PRINTING CONTROLLER

[75] Inventors: Kenji Nakano; Kazuyuki Ogawa, both of Kanagawa, Japan

[73] Assignee: Sony Corporation, Tokyo, Japan

[21] Appl. No.: 667,235

[22] Filed: Mar. 8, 1991

Related U.S. Application Data

[63] Continuation of Ser. No. 238,092, Aug. 29, 1988, abandoned.

[30] Foreign Application Priority Data

Sep. 14, 1987 [JP] Japan .................. 62-228438
Sep. 14, 1987 [JP] Japan .................. 62-228439

[51] Int. Cl.⁵ ............................. H04N 5/782
[52] U.S. Cl. .................................. 358/335
[58] Field of Search ............. 360/72.1, 35.1, 33.1, 360/10.3; 358/335, 310, 906

[56] References Cited

U.S. PATENT DOCUMENTS

| | | | |
|---|---|---|---|
| 3,943,563 | 3/1976 | Lemelson | 360/35.1 |
| 4,041,463 | 8/1977 | Slutzky et al. | 364/900 |
| 4,130,834 | 12/1978 | Mender et al. | 360/35.1 |
| 4,212,037 | 7/1980 | Lemelson | 360/35.1 |
| 4,262,301 | 4/1981 | Erlichman | 360/35.1 |
| 4,490,747 | 12/1984 | Yokoyama | 360/35.1 |
| 4,604,668 | 8/1986 | Lemelson | 358/335 |
| 4,774,575 | 9/1988 | Takayama | 358/335 |
| 4,802,018 | 1/1989 | Tanikawa et al. | 360/35.1 |
| 4,805,039 | 2/1989 | Otake et al. | 358/335 |
| 4,827,347 | 5/1989 | Bell | 358/906 |
| 4,873,584 | 10/1989 | Hashimoto | 358/335 |
| 4,888,648 | 12/1989 | Takeuchi et al. | 358/335 |

Primary Examiner—Donald McElheny, Jr.
Attorney, Agent, or Firm—Limbach, Limbach & Sutton

[57] ABSTRACT

A VTR incorporating a video printing controller comprising at least one rotary magnetic head for scanning recording tracks formed on a magnetic tape to reproduce a video signal recorded on a recording track specified by a marker signal, a marker signal detector for detecting the marker signal specifying the recording track carrying the video signal to be printed, and a system controller connected to the marker signal detector and to a video printer connected to the VTR. The system controller gives a video printer control signal to the video printer upon receipt of a marker signal detection signal from the marker signal detector to control the video printer for printing out in a hard copy the video image reproduced from the recording track specified by the marker signal. Thus, the recording track storing the video image desired to be printed is located automatically by searching the recording tracks for the marker signal, and then the desired video signal is printed out automatically.

8 Claims, 7 Drawing Sheets

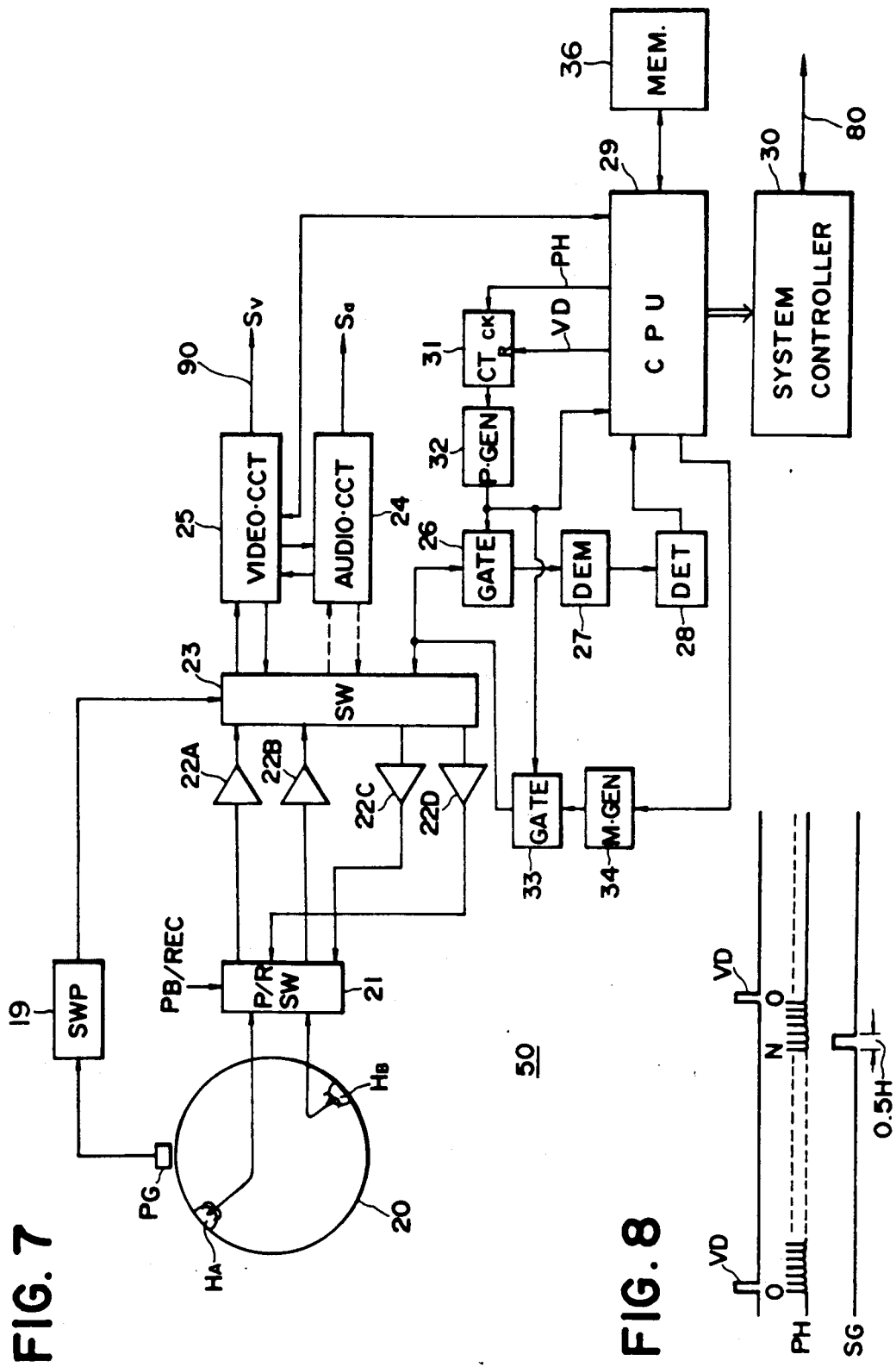

VIDEO TAPE RECORDER WITH A VIDEO PRINTING CONTROLLER

This is a continuation of co-pending application Ser. No. 238,092, filed on Aug. 19, 1988, now abandoned.

BACKGROUND OF THE INVENTION

1. Field of the Invention

The present invention relates to a video tape recorder (VTR) with a video printing controller, and more particularly to such a VTR which is capable of providing a video signal representing a specified image for printing the image in a hard copy by a printer.

2. Description of the Prior Art

Recently, the spread of video cameras and the progress in technology relating to video tape recorders (hereinafter abbreviated to "VTR") have made possible the recording of high-quality images and the reproduction of the recorded images in clear color pictures, and a color printer capable of printing an image represented by an image signal recorded by the VTR in a hard copy is in the initial stage of practical application. Such progress in video signal processing technology makes possible the reproduction of image information taken by a video camera and recorded by the VTR in a hard copy similar to a photographic print.

Image signals recorded by the VTR can be printed by a color printer or the like by the following methods.

(1) Images recorded on a magnetic tape by the VTR are reproduced and a desired image to be printed, among those being continuously and serially displayed on a monitor TV set, is selected by operating a color printer connected to the image signal output terminal of the VTR. The printer stores the image signal representing the desired image when the desired image is displayed on the monitor TV set and prints the image signal in a hard copy.

(2) Image signals recorded on a magnetic tape by the VTR are simultaneously reproduced and displayed on a monitor TV set. The VTR is commanded to pause when a desired image is displayed on the monitor TV set to hold the image still, and a color printer connected to the image signal output terminal of the VTR is operated to print the desired image in a hard copy.

The method of (1) has the problem that the desired image cannot be printed with certainty unless the color printer is operated at the proper moment, because the image signal representing the desired image must be transferred to the color printer during the active reproduction of images, i.e. while the magnetic tape is being transported through the VTR.

The method of (2) is able to print a particular desired image without fail because the video signal representing the desired image is given to the color printer while the VTR is in the pause mode. However, the quality of the image, in general, is deteriorated when the VTR is paused and hence it is impossible to obtain a clear color print.

In an 8 mm video recording system, an index signal is added to a postamble area in each recording track in a mode in which video signals and audio signals are recorded simultaneously as PCM data. The index signals are used for cue searching. However, some simple 8 mm VTRs are not equipped with a PCM recording function and such simple 8 mm VTRs are not provided originally with any fixed head. Therefore, such simple 8 mm VTRs are unable to locate cues for recorded video signals, and hence such a simple 8 mm VTR takes a long time to search for a desired video signal and to print an image represented by that desired video signal.

Accordingly, it is an object of the present invention to provide a VTR with a video printing controller, capable of adding marker signals to skewed video tracks of a magnetic tape at predetermined positions during recording or reproducing operations, detecting the marker signals through a cue search operation, and enabling the reproduction of images recorded in a desired video track after detecting the marker signal.

The VTR is connected to a color printer by bilateral (two) bus lines so that when the video signal specified by the marker signal is provided in the reproducing mode the video signal is transferred to the field memory of the color printer and the color printer is actuated for printing the video signal. Thus, an optional image can easily be selected through a simple operation and the selected image can be printed in a clear color print.

In an 8 mm VTR according to the present invention, a portion of the skewed video track corresponding, for example, to a V-P guard space is detected by a counting circuit which counts clock signals on the basis of a vertical synchronizing signal, and a marker of a predetermined format is recorded in portions of several tracks corresponding to the V-P guard space.

Ordinarily, in the simple 8 mm VTR, the angle of contact of the magnetic tape on the rotary drum is slightly greater than 180°, and a part of the V-P guard space of the skewed track of an 8 mm recording format engages the rotary drum first, and hence part of the V-P guard space is available for use as a recording area. Accordingly, when the recording area passes the rotary head in the recording mode, a predetermined marker signal is recorded in the recording area by the rotary head to add a mark for identifying a track in which the desired video signal is recorded, thereby enabling the marked video signal to be found in the search mode.

BRIEF DESCRIPTION OF THE DRAWINGS

The above and other objects, features and advantages of the present invention will become apparent from the following description taken in conjunction with the accompanying drawings, in which:

FIG. 7 is a block diagram of assistance in explaining a procedure for reproducing (or recording) a marker signal M;

FIG. 8 is a time chart of assistance in explaining the manner of searching for a desired marker signal to locate a desired video signal;

DESCRIPTION OF THE PREFERRED EMBODIMENTS

Figure 2:
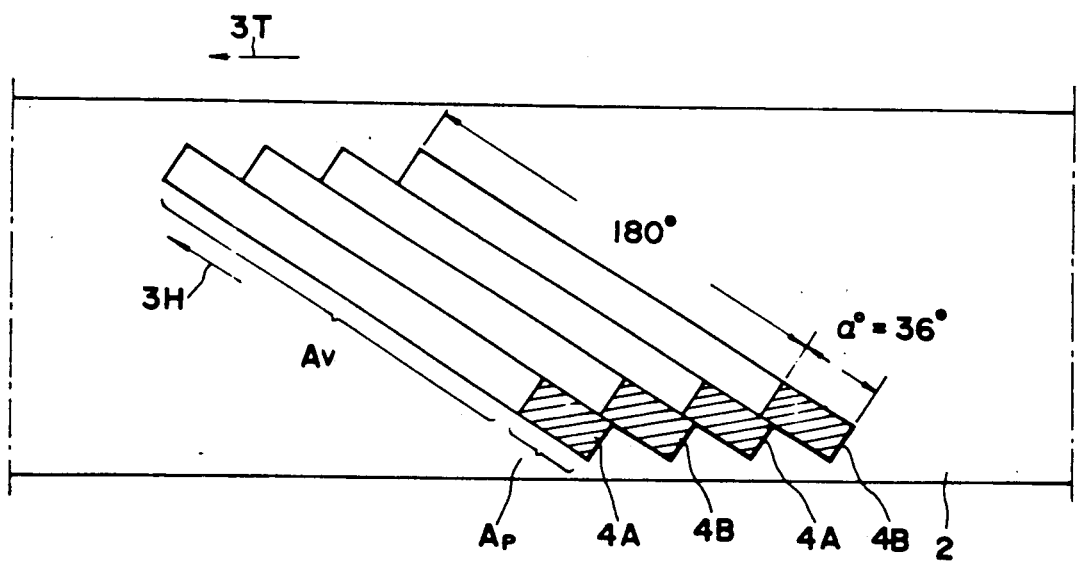
FIG. 2 is a diagram showing a tape format for an 8 mm VTR.
Figure 3:
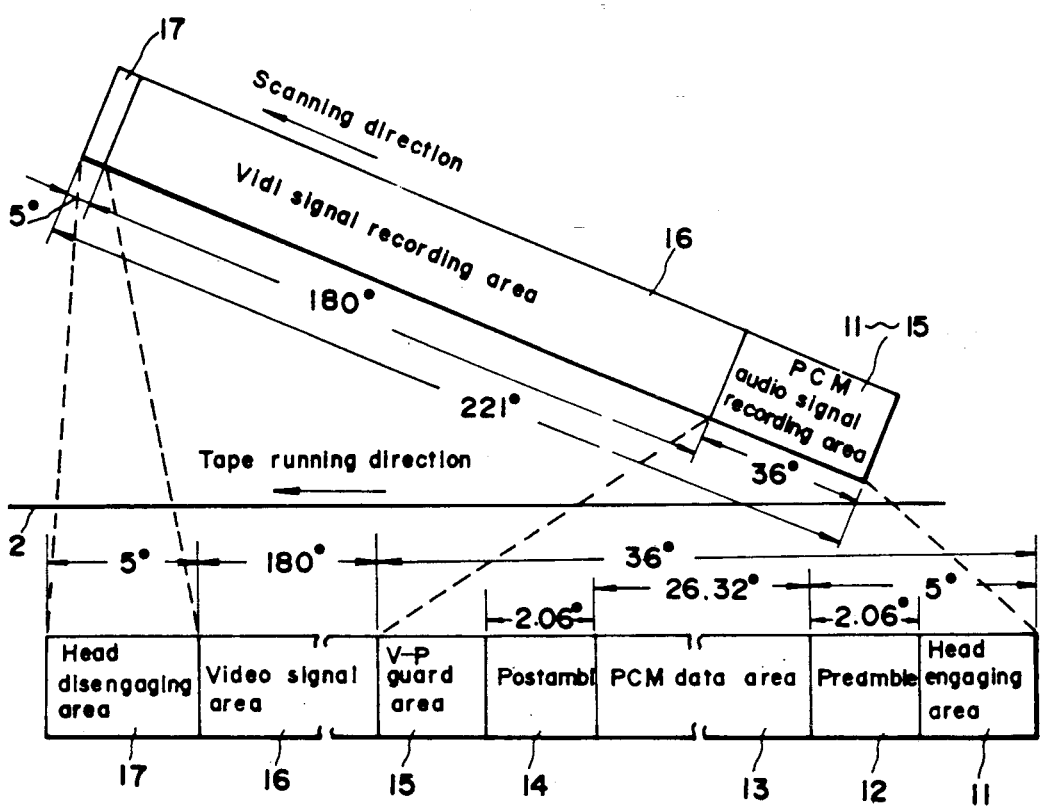
FIG. 3 is a diagram showing the track format for an 8 mm VTR.

An 8 mm VTR will be described hereinafter with reference to FIGS. 1 through 3 prior to the description of the present invention.

The 8 mm VTR has already been standardized and commercialized. The 8 mm VTR records video signals and audio signals on an 8 mm video tape and reproduces the recorded video signals and audio signals.

Figure 1:
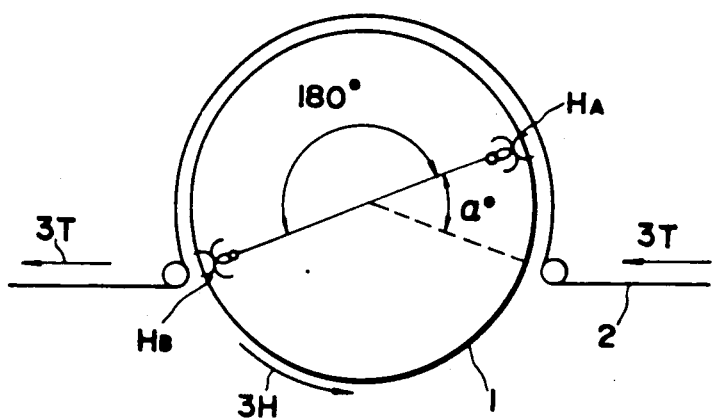
FIG. 1 is a plan view of an exemplary rotary head for an 8 mm VTR.

Shown in FIG. 1 is a rotary magnetic head unit comprising rotary magnetic heads $H_A$ and $H_B$ for recording-/reproducing, a rotary drum 1, and a magnetic tape 2 wound around the rotary drum 1 through an angle of contact of $180° + \alpha$ ($\alpha$ is about 36°) and driven for running in the direction of the arrow 3T. The rotary magnetic heads $H_A$ and $H_B$ are arranged at an angular interval of 180°. The rotary magnetic heads $H_A$ and $H_B$ have different magnetic gap azimuth angles, and project slightly from the rotary drum 1. The rotary magnetic heads $H_A$ and $H_B$ rotate at a rotating speed corresponding to the frame frequency (30 Hz) of the video signals in the direction of the arrow 3H. Accordingly, skewed tracks 4A and 4B, which are different in azimuth, are formed alternately on the magnetic tape 2 as shown in FIG. 2.

Ordinarily, video signals are recorded in areas AV of the tracks 4A and 4B, corresponding to a 180° rotation angle of the head, and signals obtained by compressing audio signals on the time axis and processing the compressed audio signals through PCM (pulse code modulation) are recorded sequentially, field by field, in areas AP corresponding to a head angle of $\alpha$ (about 36°). It is also possible to record audio signals in the area AV for video signals by feeding the audio signals to the rotary magnetic heads $H_A$ and $H_B$ after frequency modulation to superpose the audio signals on the video signals.

Since the 8 mm VTR has the ability to record and reproduce audio signals by the rotary magnetic heads $H_A$ and $H_B$, the 8 mm VTR is capable of recording and reproducing audio signals of a very high quality.

The track format of the 8 mm VTR will be described more particularly with reference to FIG. 3. Each recording track consists of an initial, head engaging area 11 of 5° of the rotation angle of the head including a preamble area 12 of 2.06° of the rotation angle of the head (corresponding to 3 horizontal intervals (3H) of video signals) for clock lines synchronized with PCM data in the latter half thereof, a PCM data area 13 of 26.32° of the rotation angle of the head for recording PCM data obtained by compressing audio signals with respect to the time axis and processing the compressed audio signals through pulse code modulation, a postamble area 14 of 2.06° of the rotation angle of the head (3H), a V-P guard area 15 of 2.62 of the rotation angle of the head, a recording area 16 of 180° of the rotation angle of the head separated from the PCM data area 13 by the V-P guard area 15, for recording video signals of one field and a pilot signal for tracking superposed on the video signals, and a head separating area 17 of about 5° of the rotation angle of the head. The initial, head engaging area 11, the preamble area 12, the PCM data area 13, the postamble area 14, the guard area 15, the video signal area 16 and the separating area 17 are arranged successively in that order.

The PCM data is represented by binary signals. It is preferable to record, for example, a logic value "1" and a logic value "0" after frequency modulation, respectively, by a signal of 5.8 MHz and a signal of 2.9 MHz. Data "1" is recorded in the preamble area 12 and the postamble area 14.

According to an invention proposed previously by the present applicant in Japanese Patent Application No. 60-64554 (corresponding to EP published application publication No. 0196104) in the ordinary reproducing mode or in a so-called multipulse code modulation reproducing mode, an index signal is recorded, for example, in the postamble area 14 and the index signal is searched for to locate a predetermined recording track associated with the index signal.

A VTR with a video printing controller, in a preferred embodiment, according to the present invention will be described hereinafter.

Figure 4:
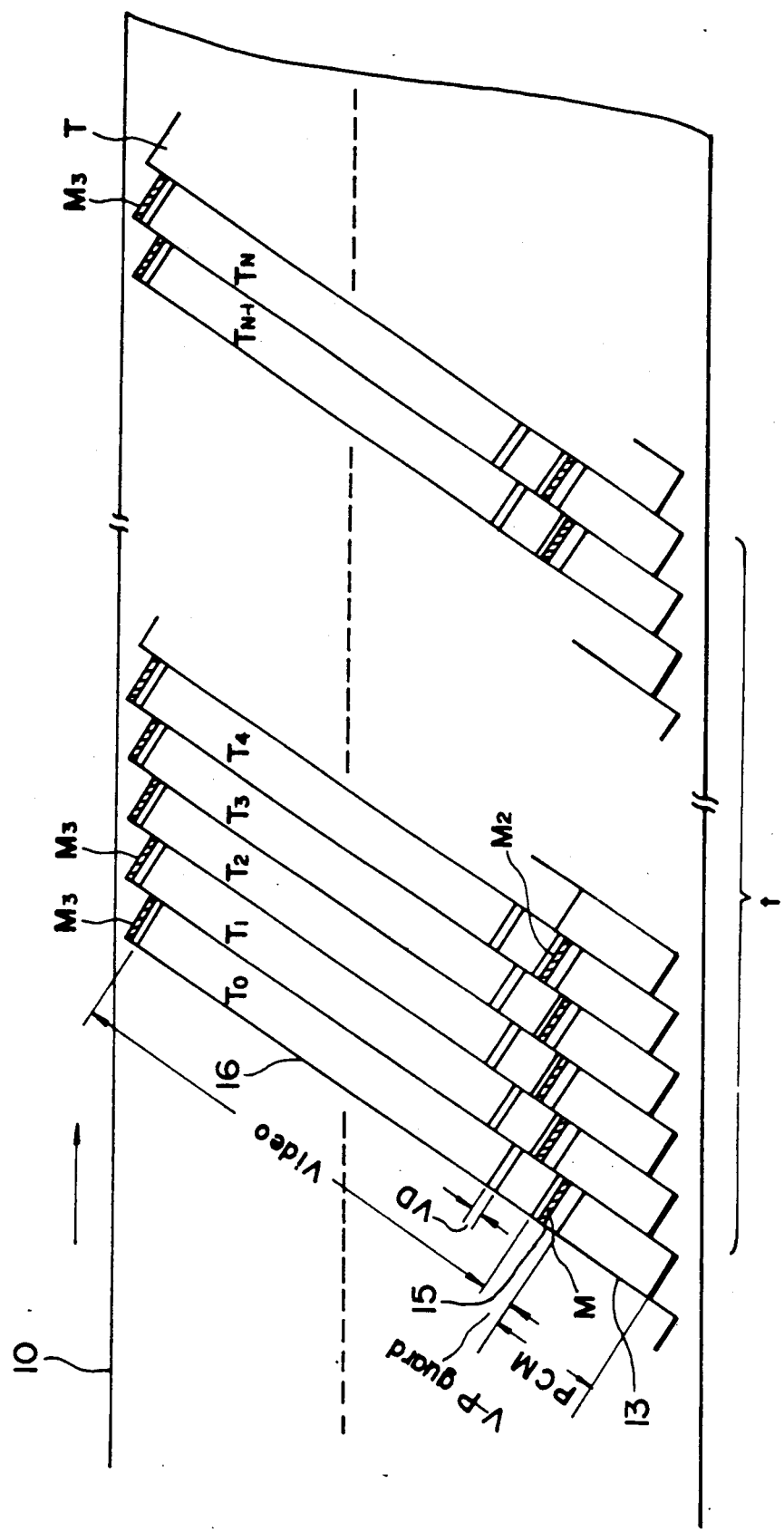
FIG. 4 is a diagram showing the recording format of an 8 mm tape employed in the present invention.
Figure 5:
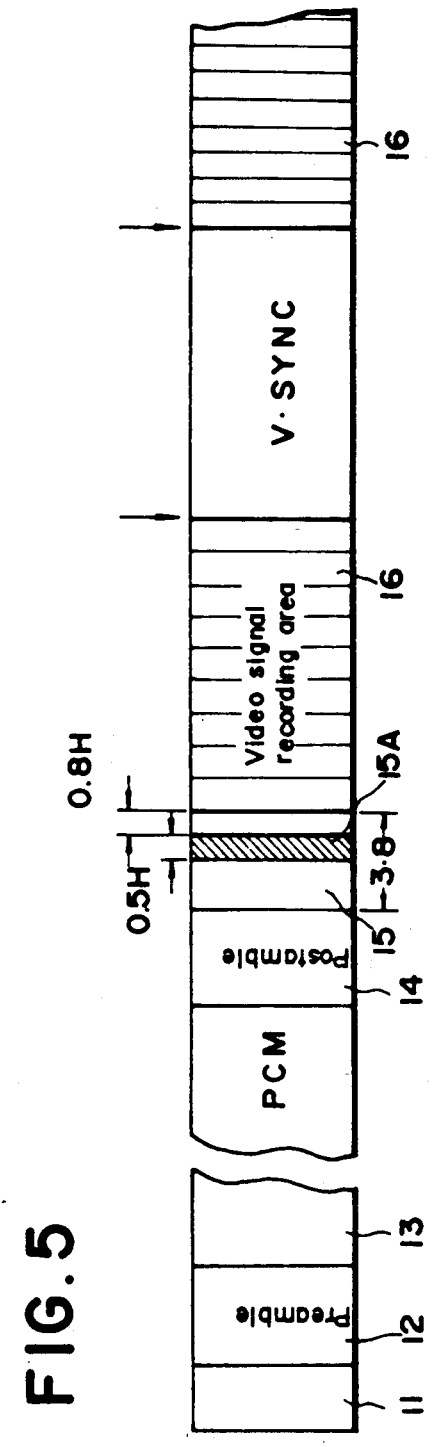
FIG. 5 is an enlarged view of a track recorded on the tape depicted in FIG. 4.

FIG. 4 shows the recording format of an 8 mm magnetic tape for use in combination with a VTR, in a preferred embodiment, according to the present invention, and FIG. 5 shows the details of the recording format. A plurality of skewed recording tracks T are formed sequentially on a magnetic tape 10 by two rotary magnetic heads. A PCM data area 13 of about 30° of the rotation angle of the head is formed in the front section of the recording track T, and a video signal recording area 16 of about 180° of the rotation angle of the head is formed in the rear section of the recording track T. A V-P guard area 15 of about 3.8H is formed before the video signal recording area 16 and after the PCM data area 13. A marker signal M is recorded in the V-P guard area of a predetermined recording track for searching.

Referring to FIG. 5, the recording track T has, in addition to the areas 13, 15 and 16, an initial, head engaging area 11, a preamble area 12 and a postamble area 14. A marker signal area 15A of about 0.5H is provided in the V-P guard area 15. For example, a marker signal M of 2.95 MHz for identifying the recording track is recorded in the marker signal area 15A.

As shown in FIG. 4, marker signals M are recorded in successive tracks $T_O$, i.e., the first track, through $T_N$ a mark period of t sec (about 10 sec) after the first track $T_O$.

The V-P guard area 15 separates the PCM data area 13 and the video signal recording area 16 corresponding to the head engaging area for 8 mm VTRs not having a PCM recording function. When the marker signal area 15A of 0.5H is formed at a position about 0.8H from the front end of the video signal recording area 16, it is possible to record signals in the marker signal area 15A with the rotary magnetic head and the recorded signals can be reproduced by the rotary magnetic head, provided that the tape path is adjusted to a standard range. Naturally, with a 8 mm VTR having the PCM recording function, signals can be recorded likewise in the marker signal area 15A and the recorded signals can be reproduced.

Accordingly, the marker signals M recorded in the plurality of successive tracks can be detected in the cue search mode. When the magnetic tape is rewound after the detection of the marker signal M and the ordinary reproducing operation is started after slightly passing the track $T_O$, an ordinary reproducing operation is implemented and, when necessary, the video signals recorded in the track $T_O$ can be transferred to the memory of a printer connected to the VTR to print out the video signals.

When another marker signal $M_2$ of 2.95/2 MHz is recorded in an optional track, for example, the track $T_4$, which is among the tracks in the mark period t in addition to the marker signal M, the optional track $T_4$ in the mark period t can be found by searching for the marker signal $M_2$ after locating the track $T_O$. The marker signal M may be coded in a digital signal.

Figure 6:
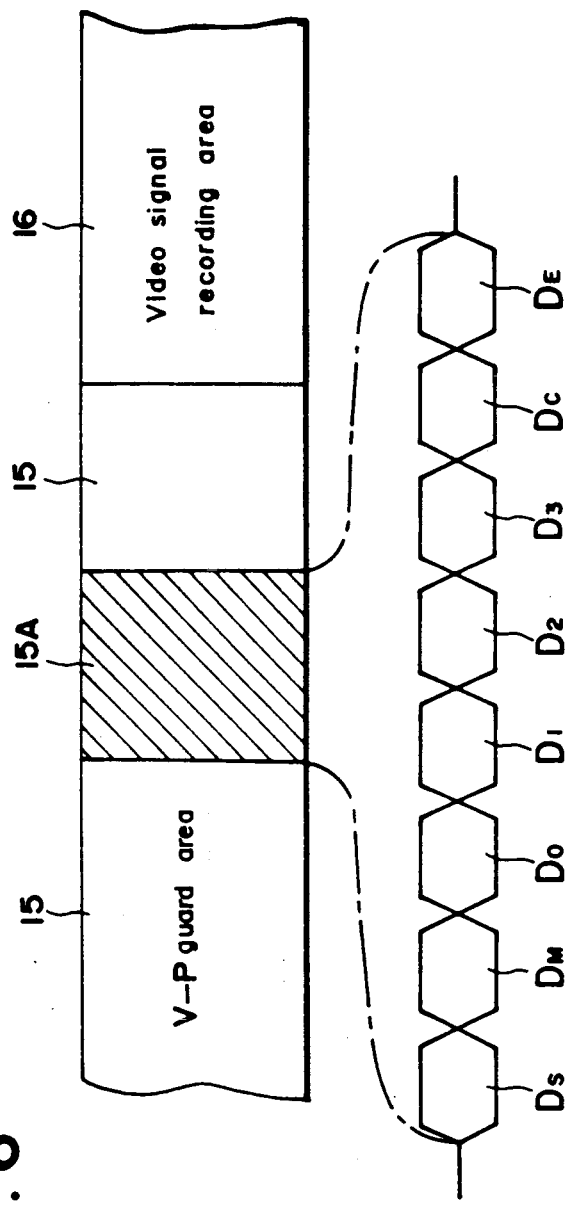
FIG. 6 is a waveform chart for coding a marker signal M.

Referring to FIG. 6, in coding the marker signal M, a start bit signal $D_S$ is provided at the front end of the marker signal area 15A of 0.5H, and then a mode bit signal $D_M$ is provided next to the start bit signal $D_S$. The mode bit signal $D_M$ identifies the attribute, namely, the time code, address code or print code, of data represented by four code signals $D_O$ to $D_3$ of eight bits following the mode bit signal $D_M$ Indicated at $D_C$ and $D_E$ are an error correction code and an end bit code, respectively. The coded marker signal M can be used for various purposes as an index signal.

A procedure for reproducing (and recording) the marker signal will be described hereinafter.

Referring to FIG. 7, a VTR 50 embodying the present invention includes a rotary drum 20 provided with two rotary magnetic heads $H_A$ and $H_B$, a playback/recording changeover switch 21, amplifiers 22A and 22B which provide reproduced signals, and amplifiers 22C and 22D which output recording signals to the rotary magnetic heads $H_A$ and $H_B$. A switching circuit 23 provides switching pulses for selecting between the rotary magnetic heads $H_A$ or $H_B$, for example, to supply reproduced PCM signals to an audio signal processing circuit 24 as indicated by dotted lines in a VTR capable of a PCM recording function, or to supply the reproduced FM audio signals to a video signal processing circuit 25 in a VTR incapable of the PCM recording function. Frequency modulated audio signals are separated from the reproduced signals by the video signal processing circuit 25 and then the audio signals are applied to the audio signal processing circuit 24.

The VTR 50 further comprises a gate circuit 26, a pulse generator 32 which generates pulses to close the gate circuit 26 for a period corresponding to the marker signal area, a demodulator 27, a signal detecting circuit 28, a control unit (CPU) 29 which provides control signals for assigning the 8 mm VTR to various operating modes, a memory 36 for the CPU 29, a system controller 30, a counter 31 for counting clock signals locked to horizontal synchronizing signals during reproduction or recording, a gate circuit 33, a marker signal generator 34 for generating marker signals to be recorded, and a switching pulse generating circuit 19 which generates a switching pulse to operate the switching circuit 23 upon the detection of a reference phase signal PG. The counter 31 is reset to zero upon the reception of a vertical synchronizing signal VD. Upon the coincidence of the clock count by the counter 31 with a predetermined count, the pulse generating circuit 32 supplies a signal having a pulse width corresponding to a period of approximately 0.5H to close the gate circuits 26 and 33.

The manner of operation of the VTR 50 for locating a desired track by searching for the marker signal representing the desired track will be described hereinafter.

The VTR 50 is characterized in that the marker signal areas 15A of the reproduced signals provided by the amplifiers 22A and 22B in the reproducing mode are applied to the gate circuit 26. The gate circuit 26 is closed for a period of about 0.5H by the output SG of the pulse generator 32 which is driven by a control signal provided by the counter 31 when the count of the horizontal synchronizing signals PH, which are provided continuously by a pulse-locked loop circuit and counted by the counter 31, increases to a predetermined value, for example, N.

The counter 31 is reset by the vertical synchronizing signal VD for the video signals and starts counting the horizontal synchronizing signals PH. Therefore, a signal reproduced by the rotary magnetic head, when it is scanning the marker signal area 15A, passes through the gate circuit 26 when it is closed. The gate circuit 26 is closed when the sum of the number of horizontal synchronizing signals for one field and a count $\alpha$ (where $\alpha$ is a number equal to the sum of two and the number of horizontal synchronizing signals provided in a period corresponding to the head engaging area 11 through the preamble area 14 shown in FIG. 5) equals the predetermined value N.

Accordingly, the marker signal M included in the output signal of the rotary magnetic head is detected by the demodulator 27, the marker signal M is digitized by the detecting circuit 28, and then the digital marker signal is given to the control unit 29. In case a cue search command has been given to the control unit 29, the control unit 29 stops the magnetic tape upon the reception of the marker signal M, sets the VTR for the rewind mode, and then changes the rewind mode into the reproducing mode after the first track $T_O$ carrying the marker signal M has passed the rotary magnetic head to find the track carrying the first marker signal M. When the track carrying the first marker signal M is found, the control unit 29 stops the magnetic tape to display a still image on a monitor 70 and at the same time provides the image signal recorded in the desired track. The track carrying the marker signal M can be assigned to an editing point. The image signal may be given to a printer to print a hard copy of the image signal.

To record the marker signal during recording, the gate circuit 33 is closed during a period determined by the counter 31 and the pulse generator 32 to record the marker signal generated by the marker signal generator 34 in the marker signal area 15A of the track.

Although the vertical synchronizing signals are used in this embodiment for controlling the operation of the counter 31, PG signals provided by the rotary drum may be used for specifying the marker signal recording area 15A on the magnetic tape 10.

Furthermore, although the marker signal area 15A is provided in the V-P guard area 15 of the track in this embodiment, the counter 31 may be set for a count so that the marker signal $M_3$ of 0.5H is recorded in the head disengaging area of the track as shown in FIG. 4, because, in simple 8 mm VTRs, the video signal area of the skewed track has the margin for the marker signal in the end portion thereof.

An exemplary video printing system incorporating the VTR 50 shown in FIG. 7 will be described hereinafter.

Figure 9:
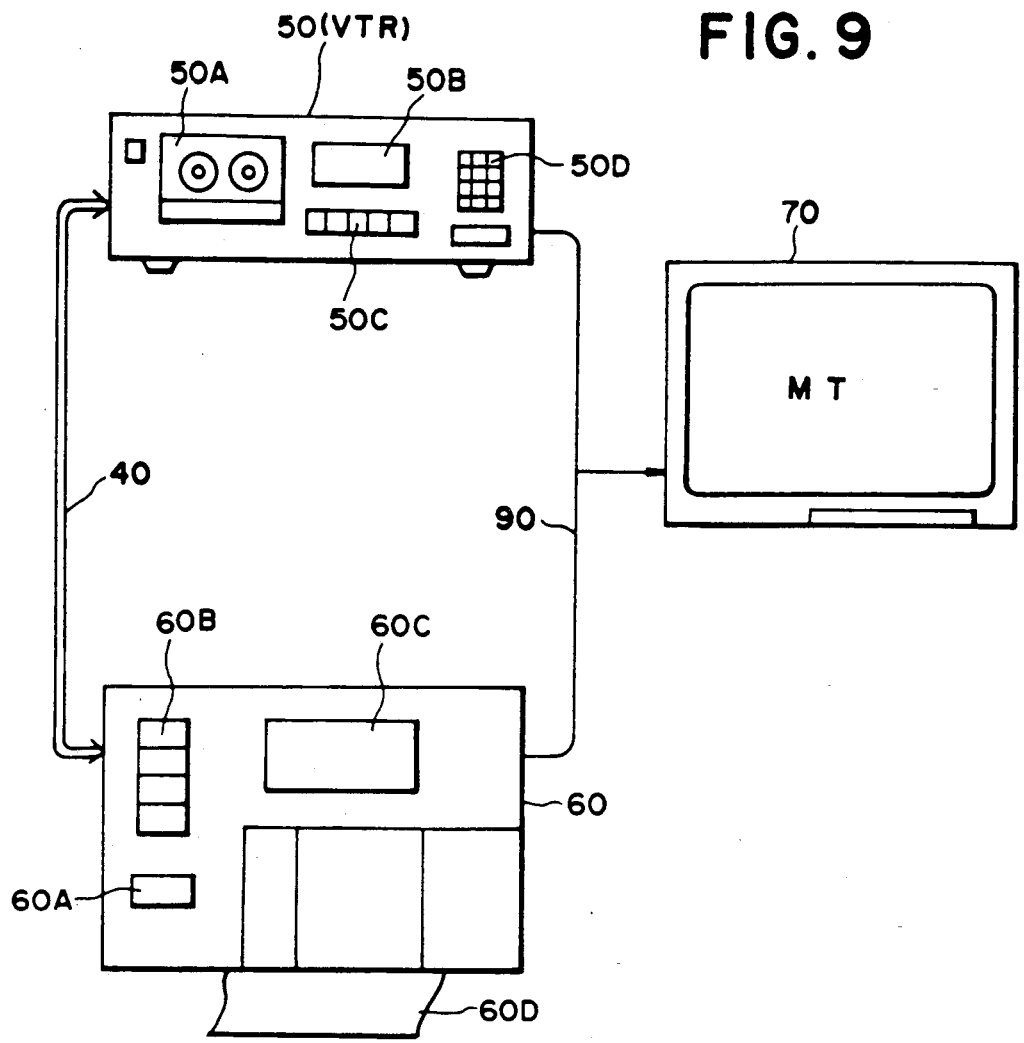
FIG. 9 is an illustration showing a print system employing the VTR of FIG. 7.

Referring to FIG. 9, the video printing system comprises the previously described 8 mm VTR 50, a color printer 60 (hereinafter referred to simply as "printer"), a monitor TV set 70, bilateral bus lines 80, and a cable 90.

The 8 mm VTR 50 has a front panel provided with a tape cassette receiving lid 50A, an indicating unit 50B, an operating unit 50C, and numeric key unit 50D. The 8 mm VTR 50 is capable of reproducing video signals recorded on the magnetic tape by a video camera and recording marker signals on desired video tracks on the magnetic tape.

The printer 60 has a start button 60A, adjusting buttons 60B for adjusting print density, hue, etc., and an indicating unit 60C. The printer 60 prints image data stored in an image data memory, not shown, in the form of a hard copy 60D.

The 8 mm VTR 50 and the printer 70 are interconnected by the bilateral bus lines 80 for transmitting control signals, and the cable 90 for transmitting video signals. The video signals are displayed on the monitor TV set 70.

Figure 10:
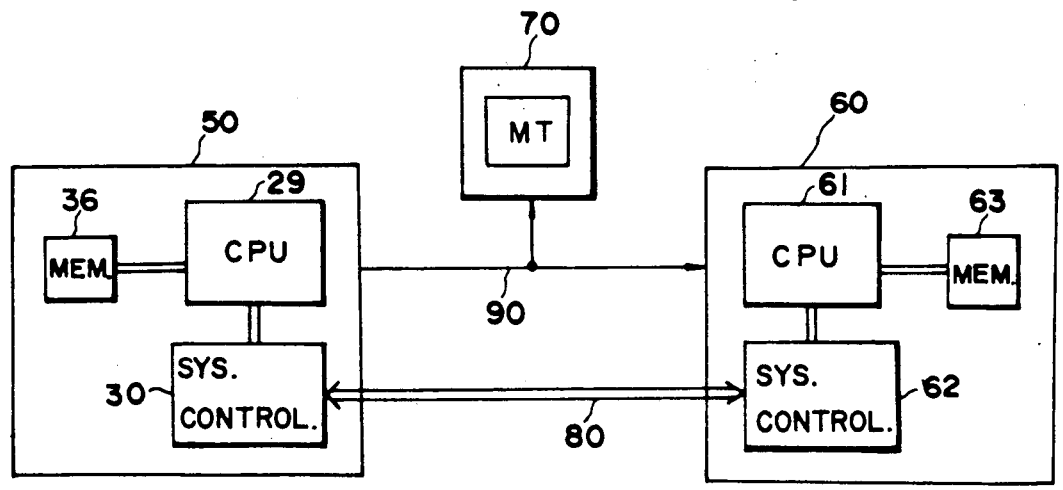
FIG. 10 is a block diagram of the print system of FIG. 9.

Referring to FIG. 10, the 8 mm VTR 50 includes, as mentioned previously with reference to FIG. 7, the CPU 29, the system controller 30 and the memory 36 as essential components.

The printer 60 has, as the essential components thereof, a CPU 61, a system controller 62 and a field memory 63. The system controller 62 is connected to the system controller 30 of the 8 mm VTR 50 by bilateral bus lines 80. The 8 mm VTR 50 gives video signals through the video cable 90 to the printer 60 and the monitor TV set 70.

The CPU 29 of the 8 mm VTR 50 controls the system controller 30 according to a control program stored in the memory 36. Similarly, the CPU 61 of the printer 60 controls the system controller 62 according to a control program stored in the field memory 63. A control program for controlling the printing operation is also stored in the memory 36 of the 8 mm VTR.

A control procedure for carrying out the printing control program to automatically print out video signals specified by the marker signals M recorded on the recording tracks of the magnetic tape will be described hereinafter with reference to FIG. 11.

In the automatic printing mode, control signals are exchanged through the bilateral bus lines 80 between the VTR 50 and the printer 60 to control each other. A magnetic tape storing an image to be printed is loaded on the VTR 50. Then, the VTR 50 is operated in the reproducing mode and the contents of the magnetic tape are monitored on the monitor TV set 70. When the desired image is displayed on the monitor TV set, the marker signal M is entered on the track carrying a video signal representing the desired image in the manner described hereinbefore. (This step is omitted when the marker signal M is recorded previously on the track.)

When an automatic printing mode is selected in step 100, the magnetic tape is rewound and then the cue-searching operation is started in step 101 to search for the marker signal M. Upon the detection the marker signal M in step 102, the magnetic tape is stopped, the magnetic tape is driven in the reverse direction to the front end of the track carrying the marker signal M, and then the VTR is set for a pause mode in step 103.

In step 104, control signals provided by the printer 60 are examined to decide whether or not the printer 60 is already in operation, i.e. if it is already printing a hardcopy. If so, the process returns to step 104 until the printer 60 is free to print a new hardcopy. When the printer 60 is not in operation, the video signal of the track carrying the marker signal M is reproduced in the normal reproducing mode, and then the VTR 50 is set to the pause mode in step 105. In this case, the reproduced video signal is transferred to and stored in the field memory 63 of the printer 60 in step 106.

Upon the reception of the video signal representing the desired image, the printer 60 starts the printing operation in step 107. When a further image desired to be printed remains on the magnetic tape, the VTR is operated in the cue search mode to detect the marker signal M of the track carrying a video signal representing the next desired image in step 109 while the printer 60 is operating. Upon the detection of the next marker signal M, the VTR 50 is set at a pause.

After the first printing cycle for printing the first desired image has been accomplished at step 110, the process returns to step 100, the beginning of the program. The next video signal on the track carrying the next marker signal M is reproduced in the normal reproducing mode, the video signal of the field is transferred to the field memory 63 of the printer 60, and then the printer 60 operates again to print the next desired image.

Figure 11:
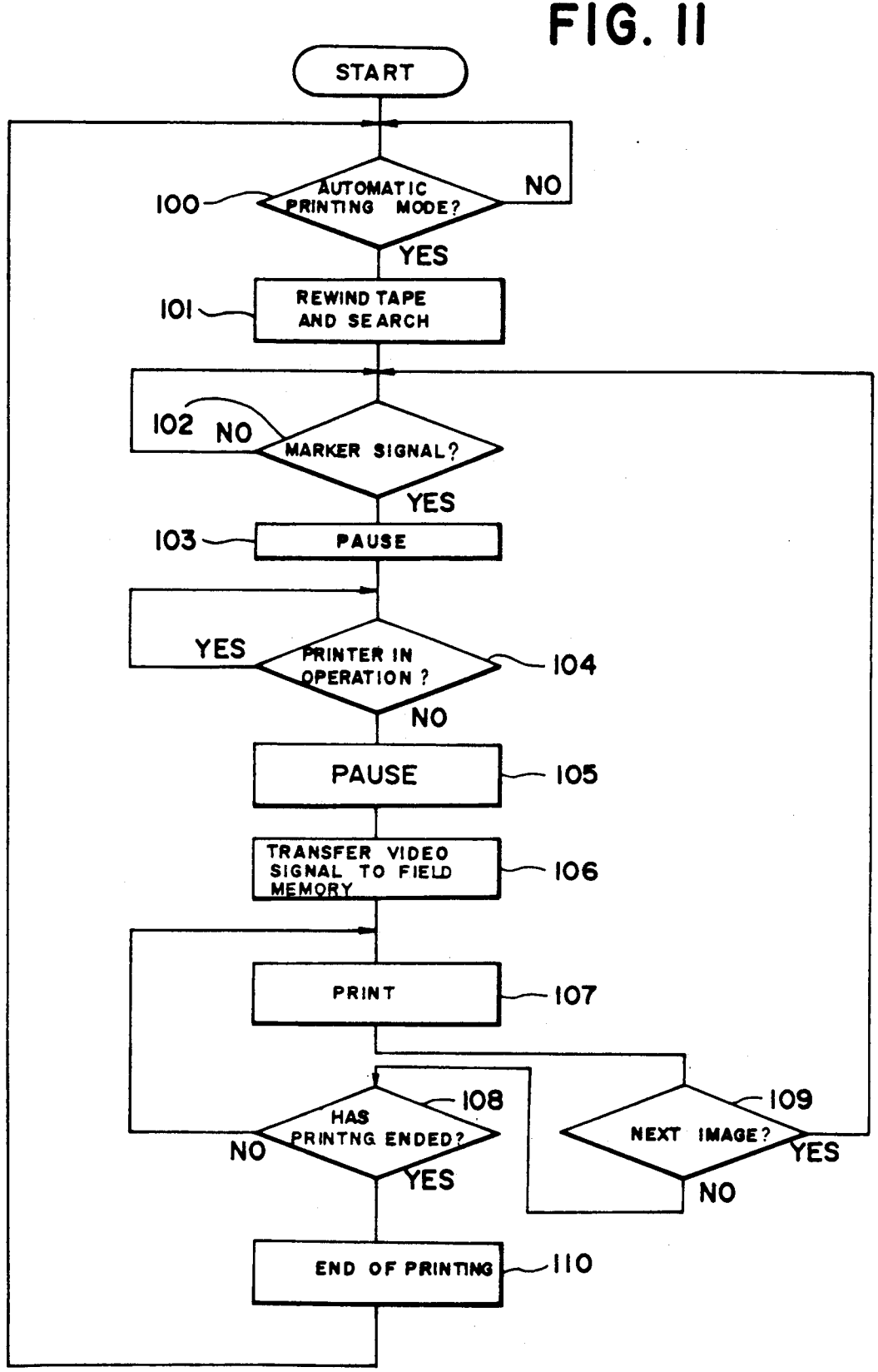
FIG. 11 is a flow chart of a print control program for controlling an automatic printing operation using a marker signal M added to a recording track of the magnetic tape.

Thus, the video printing system incorporating the VTR of the present invention carries out the control procedure shown in FIG. 11 to print desired images in hard copies. The marker signals may be entered by operating the printer 60, and operations of the 8 mm VTR 50 necessary for printing the desired images may be controlled by control signals provided by the printer 60.

When the marker signal M is coded data, a track carrying a video signal representing an image desired to be printed may be specified by operating the numeric keys of the VTR 50. In such a case, words which are not used as control signals for the remote control of the VTR may be used a control signals.

As is apparent from the foregoing description, in the video printing system incorporating the VTR of the present invention, the VTR assigns marker signals to tracks carrying video signals representing images desired to be printed and locates the tracks carrying the marker signals by searching for the marker signals. The printer, which is connected by bilateral bus lines to the VTR and is provided with a field memory, prints the desired images automatically and continuously in clear hard copies.

Although the invention has been described in its preferred form with a certain degree of particularity, obviously many variations and changes are possible therein. It is therefore to be understood that the invention may be practiced otherwise than specifically described herein without departing from the scope and spirit thereof.

What is claimed is:

1. A video tape recorder of the type in which a digitized audio signal is recorded together with a video signal in a video signal recording area on skewed tracks on a magnetic tape, incorporating a video printing controller for use with an external monitor and a video printer of the type having its own system controller, comprising:

a rotary magnetic head for scanning the skewed tracks formed on the magnetic tape to reproduce information signals recorded on the skewed tracks;

marker signal detecting means connected to the rotary magnetic head for detecting marker signals coded in digital signals and recorded by said rotary magnetic head in an area between a PCM data area and the video signal recording area on each of a selected plurality of successive, skewed tracks formed on the magnetic tape carrying information signals to be printed, during real time playback of the information signals, and outputting a corresponding marker signal detection signal;

system control means connected to the marker signal detecting means, for generating a print control signal to the video printer upon the receipt of the marker signal detection signal;

bilateral bus lines for connecting the system control means of the video tape recorder with the system controller of the video printer to exchange control signals therebetween and to give printer control signals to the video printer; and a video cable for outputting reproduced video signals to the video printer and an external monitor.

2. A video tape recorder incorporating a video printing controller, as recited in claim 1, wherein said video tape recorder is capable of a search mode, in which the magnetic tape is driven at a speed higher than the normal speed for recording and reproducing and said rotary magnetic head reproduces said marker signal when the video tape recorder is set int he search mode.

3. A video tape recorder incorporating a video printing controller, as recited in claim 2, wherein the marker signal detecting means detects a first marker signal recorded on a plurality of successive skewed tracks, and a second marker signal recorded on one particular track among the plurality of successive tracks provided with the first marker signal.

4. A video tape recorder incorporating a video printing controller, as recited in claim 1, wherein the marker signal detecting means detects a first marker signal recorded on a plurality of successive skewed tracks, and a second marker signal recorded on one particular track among the plurality of successive tracks provided with the first marker signal.

5. In combination, a video tape recorder of the type in which a digitized audio signal is recorded together with a video signal in a video signal recording area on skewed tracks on a magnetic tape and in which marker signals may be recorded in an area between a PCM data area and a video signal recording area on each of a plurality of successive skewed tracks formed on the magnetic tape, an external monitor, a video printer of the type having its own system controller and a video cable for outputting reproduced video signals to the video printer and the external monitor, wherein the video tape recorder comprises:

a rotary magnetic head for scanning the skewed tracks formed on the magnetic tape to reproduce the video image information signals and the marker signals recorded on the skewed tracks;

marker signal detecting means connected to the rotary magnetic head for detecting marker signals coded in digital signals and recorded by said rotary magnetic head in predetermined areas on selected ones of the recorded tracks carrying information signals to be printed, during real time playback of the information signals, and outputting a marker signal detection signal;

system control means connected to the marker signal detecting means, for generating a print control signal to the video printer upon the reception of the marker signal detection signal; and bilateral bus lines for connecting the system control means of the video tape recorder with the system controller of the video printer to exchange control signals therebetween and to give printer control signals to the video printer.

6. The combination, as recited in claim 5, wherein said video tape recorder is capable of a search mode, in which the magnetic tape is driven at a speed higher than the normal speed for recording and reproducing and said rotary magnetic head reproduces said marker signal when the video tape recorder is set in the search mode.

7. The combination, as recited in claim 6, wherein a first marker signal is recorded on a plurality of successive skewed tracks, and a second marker signal is recorded on one particular track among the plurality of successive tracks provided with the first marker signal.

8. The combination, as recited in claim 5, wherein a first marker signal is recorded on a plurality of successive skewed tracks, and a second marker signal is recorded on one particular track among the plurality of successive tracks provided with the first marker signal.

* * * * *